Patented June 25, 1946

2,402,903

UNITED STATES PATENT OFFICE 2,402,903

PROCESS FOR COATING SHEET MATERIALS

Peter J. Massey and Lothian M. Burgess, Chicago, Ill., assignors to H. P. Smith Paper Company, Chicago, Ill., a corporation of Illinois No Drawing. Application September 27, 1944, Serial No. 556,094

5 Claims. (Cl. 117—168)

This invention relates to the laminating of sheet materials such as paper, regenerated cellulose films, cellulose ether or ester films, vinyl polymer films, foil, rubber and rubber derivatives, webs and the like or similar sheets or films to each other and/or to themselves in two or more plies.

This invention is particularly directed to a process for laminating such sheet materials with heat liquefiable, thermoplastic materials having the properties of rendering such laminated sheets moisture vaporproof and/or waterproof.

It is generally known that waxy or waxlike materials, particularly the petroleum or mineral oil derived waxes, are among the best known moisture proofing materials available. These include the paraffin waxes, the petroleum "jellies" and the "amorphous" or "microcrystalline" waxes and other well known waxes, and some synthetic waxes, all hereinafter referred to as waxes, with or without modifying agents or any of the compatible resins, rosins, gums, film formers, elastomers, etc., natural, factitious or wholly synthetic.

The use or application of these waxes alone for laminating, for example, paper which is pervious, is practically impossible without the addition of a material which increases the viscosity of the wax at and above its melting point so that it may be applied as a continuous film over one of the sheets without undue penetration or absorption. When applied alone, these waxes would permeate into the fibres and would not act either as an adhesive laminant or as a barrier to the passage of moisture. Additionally very important is the necessity to minimize "bleeding" or "strike-through" at higher temperatures, e. g., 140° F. in the finished product.

Among the common materials for increasing viscosity of these waxes are the higher fatty acid soaps of metals such as aluminum oleate, palmitate or stearate and mixtures of these with varying ratios of aluminum to fatty acid. These metallic soaps are soluble in the petroleum waxes, or at least are dispersible therein, with the formation of jells with greatly increased viscosity at concentrations of about three percent (3%) by weight and upwards; increasing amounts of these metallic soaps greatly increase this viscosity in ratios exceeding a straight line function. For example, the following table is shown as illustrative:

TABLE I

Viscosity at 280° F. with varying percentages of aluminum stearate in microwax

[41 penetration and 146° F. melting point]

| Percent aluminum stearate | Viscosity in centipoises |
|---|---|
| 3 | 15 |
| 4 | 15 |
| 5 | 180 |
| 6 | 775 |
| 7 | 2,000 |
| 8 | 2,965 |
| 9 | 4,520 |

However, the viscosity increase is not permanent and great difficulties have been encountered in the past when the compound is maintained at the elevated temperatures necessary for application to the sheets or webs. Under such conditions there occurs a rapid degradation in viscosity.

Heretofore, in the preparation of aluminum stearate wax jells it has been the universal practice to prepare the compound in batch type operations in substantially the following manner: The wax is melted and the temperature raised to not over 180° F.; then the finely divided aluminum stearate powder is added and mechanically agitated until thoroughly dispersed. The temperature of the batch is then slowly raised and at 220° F. or thereabouts the aluminum stearate begins to dissolve or disperse with the gradual formation of a jell of greatly increased viscosity reaching its maximum at about 275° F. or over. This compound is then ready for use, the batch being maintained at a temperature to give the proper viscosity, this temperature being dependent upon the amount of aluminum stearate and for greater amounts, must be higher.

A typical example of such prior practice is one in which four percent (4%) of aluminum stearate is dispersed in micro crystalline wax of 35 penetration at 77° F. (A. S. T. M. D-5-25) and 160° F. melting point (A. S. T. M. D-127-30). This compound can be applied at a temperature of about 280° F. on a coating machine. At this temperature the laminating compound has a viscosity of 580 centipoises and spreads readily. A finished sheet made with this compound as initially prepared is highly resistant to the passage of moisture vapor and when tested in an oven at 140° F. for four hours, showed no stain or bleeding through of the compound. However, after a few hours the remainder of the batch has lost sufficient viscosity to cause it to strike-through the sheet and, furthermore, the finished sheet begins to show bleeding at 140° F. With continued heating, this condition becomes aggravated and the laminated sheets are progressively inferior in quality.

In this former batch type of operation, in which large quantities of compound must be made at one time, it is necessary to maintain the compound at the elevated temperature for long periods of time with recirculation and mechanical agitation. This period may be twenty-four hours or longer. The following table illustrates examples of this degradation in viscosity:

TABLE II

*Loss in viscosity after heating at 280° F. for varying time periods*

| Hours heated | Viscosity CP at 280° F. |
|---|---|
| 1 | 700 |
| 2 | 620 |
| 3 | 580 |
| 4 | 500 |
| 5 | 475 |
| 6 | 450 |
| 7 | 435 |
| 8 | 400 |
| 9 | 390 |
| 10 | 375 |
| 11 | 350 |
| 12 | 340 |
| 13 | 320 |
| 14 | 310 |
| 15 | 275 |

It is not possible to add powdered aluminum stearate to increase the viscosity of the degraded jell because at the higher temperature the metallic soap merely fuses or melts into hard, relatively insoluble lumps or pellets unless the temperature is raised to over 400° F. and this becomes practically impossible.

As distinguished from the foregoing, and in accordance with our present invention, we have discovered that if a concentrated storage stable aluminum soap-wax jell is first made, it may be dispersed or dissolved in proportioned amount directly into a body of wax preheated to the elevated temperature at which it is subsequently used, and continuously withdrawn and applied to the surface of the sheet material to provide therefor a non-penetrating laminant at a substantially constant viscosity, and that this operation may be carried out continuously.

As contrasted with the prior batch operation in which the entire bulk supply of compound is of necessity maintained for hours at elevated temperatures, in this new operation the finished compound is maintained at the working temperature only a matter of minutes. The drop in viscosity becomes negligible, and even if degradation does occur, due to extraneous causes such as mechanical machine troubles or the like, causing temporary shut down, it could be immediately corrected by the addition of small quantities of the concentrated jell.

In the preparation of this jell concentrate we may use, say, approximately 50% by weight of an aluminum soap of a higher fatty acid and 50% wax (or a composition of any other convenient proportion such as from about 40 to about 60% of the soap and from about 60 to about 40% by weight of the wax). It may be prepared by compounding in a heated state in any type of heavy duty mastic or dough mixer, rubber mixing rolls, a Banbury type mixer, or the like, and immediately cooled in any convenient size slab or formation. In this condition the concentrate is storage stable and not subjected to any conditions which alter its subsequent jell-forming characteristics.

In one specific example for the purpose of illustration, and not limitation, of our process for continuously preparing a laminating compound using the concentrated jell, we may pump liquefied microcrystalline wax preheated at a temperature of about 300° F. to a small mixer into which a 50/50 compound jell of the same micro-wax and aluminum stearate, prepared as previously described, is extruded through an orifice, or a series of fine orifices or the like, into a mixer where it is immediately dispersed into the wax. The aluminum stearate may be at room temperature or preferably somewhat heated to facilitate its extrusion into filaments. The laminating compound containing the desired proportions of aluminum stearate is prepared by controlling the rate of pumping the wax and the rate of extrusion of the aluminum stearate-wax concentrate to provide an aluminum stearate concentration of about 5% by weight, and the resultant dispersion is continuously withdrawn and delivered to the laminating machine at approximately the same rate that it is used on the paper.

It will be understood that although the final jell comprises a major proportion by weight of the wax component, that the described metallic soap may be in the proportion of from about 3% to about 10% by weight, and that as previously indicated other modifying or plasticizing agents may also be included in like minor proportions. Also, although the within jells and our method of preparation and application have been particularly described for use as laminants, it will be understood by those skilled in the art that they may also be employed to good advantage in formation and preparation of certain coated sheet materials.

We claim as our invention:

1. The method of applying an aluminum higher fatty acid soap-wax jell to sheet material at a substantially constant viscosity to provide a non-penetrating laminant which comprises preparing a concentrated jell of said components by heating and mixing said components together, cooling the concentrate immediately after its preparation to render it storage stable, and then continuously dispersing the concentrated jell in regulated proportions into preheated wax and continuously withdrawing and applying the resultant dispersion to a surface of the sheet material.

2. The method of applying a jell comprising a major proportion by weight of a wax and a relatively small proportion by weight of an aluminum stearate in heat liquefied condition to sheet material at a substantially constant viscosity to provide a non-penetrating laminant which comprises preparing a concentrated jell of said components containing a relatively large proportion of said aluminum stearate by heating and mixing said components together, cooling the concentrate immediately after preparation to render it storage stable, and subsequently continuously dispersing the concentrate in regulated proportions into a heat liquefied wax to provide therein said relatively small proportion of the aluminum stearate and continuously withdrawing and applying the resultant dispersion to a surface of a sheet of the material to be laminated.

3. The method of applying a jell comprising a major proportion by weight of a wax and including from about 3% to 10% by weight of an aluminum soap of a higher fatty acid to sheet material at a substantially constant viscosity to provide a non-penetrating laminant and a moisture and moisture vapor-proof barrier which comprises initially preparing a concentrated jell containing from about 40 to about 60% by weight of said aluminum soap from about 60 to about 40% by weight of said wax by heating and mixing said components together, promptly cooling the concentrate after preparation, and subsequently continuously dispersing the concentrate into a body of wax preheated to application temperature in proportioned amount to provide said relatively smaller proportion of aluminum soap therein, and continuously withdrawing and applying the resultant dispersion to a surface of the sheet material to be laminated.

4. The method of forming a water and moisture vapor resistant sheet material laminate which comprises heating and intimately admixing a composition comprising from about 40 to about 60% by weight of aluminum stearate and from about 60% to about 40% by weight of a wax to form a concentrated jell and cooling the concentrate immediately after formation to render it storage stable, continuously dispersing a proportioned amount of said concentrate into a body of said wax preheated to a temperature of approximately 300° F. to form a jell having an aluminum stearate content of from about 3% to about 10% by weight, and continuously withdrawing and applying the resultant dispersion, at a substantially constant viscosity, to a surface of the sheet material to be laminated.

5. In the process of applying a wax-aluminum soap of a higher fatty acid jell containing a major proportion by weight of said wax and from about 3% to about 10% of said soap while heated to a viscosity regulated to provide a non-penetrating laminant for sheet material and to form a substantially water and moisture vapor-proof barrier therefor, the steps which comprise heating and masticating said wax with a relatively high percentage of said soap to disperse and dissolve the soap in the wax and to form a concentrated jell, cooling said jell to form a storage stable product, and thereafter continuously dispersing proportioned amounts of said concentrated jell to a body of said wax preheated substantially to said application temperature to provide a jell of said lower soap content therein and continuously withdrawing and applying the resultant dispersion.

PETER J. MASSEY.
LOTHIAN M. BURGESS.